Dec. 11, 1962     F. L. HICKS     3,067,966
CABLE REEL HANDLING APPARATUS
Filed Dec. 5, 1960     3 Sheets-Sheet 1
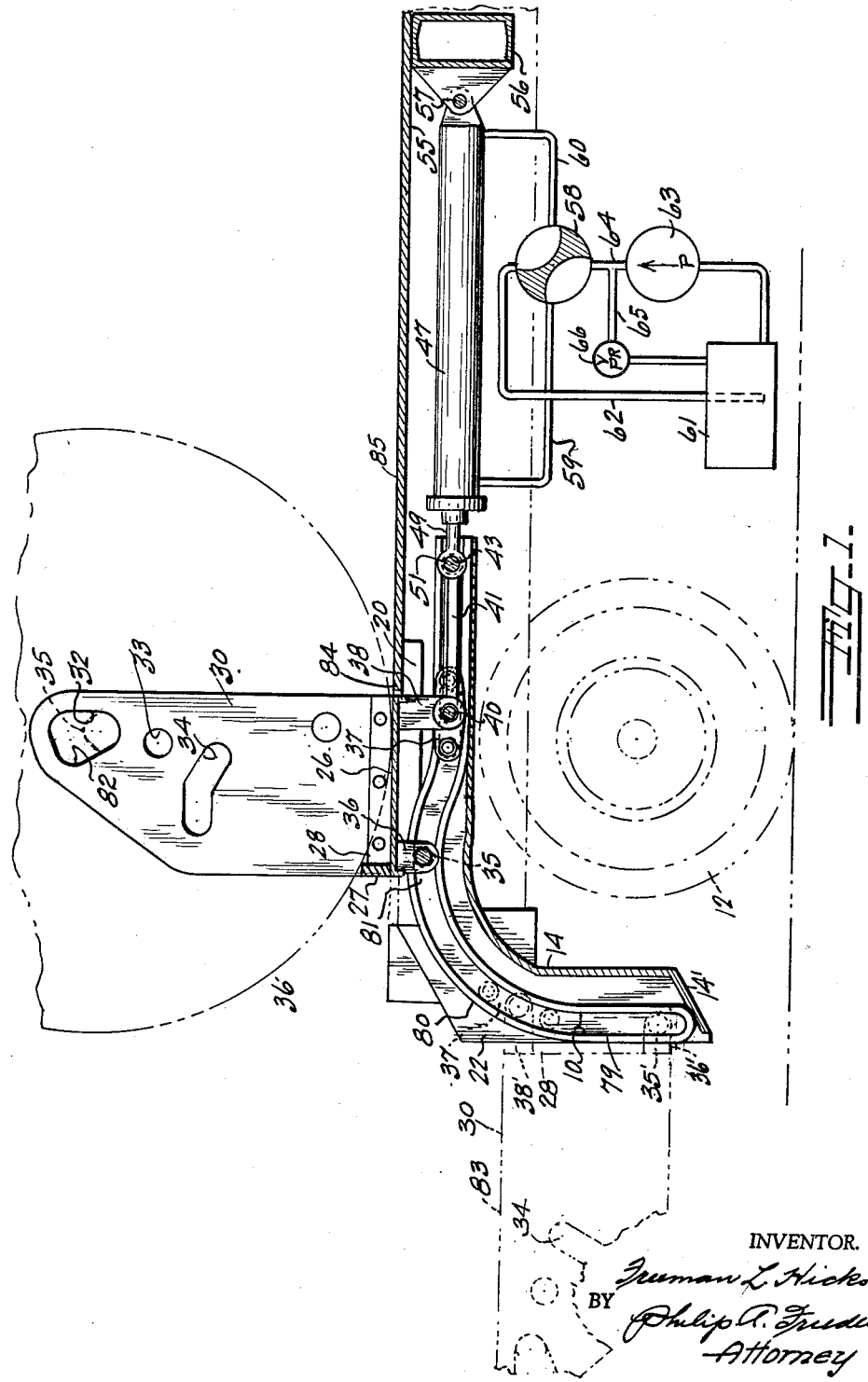
INVENTOR.
Truman L. Hicks
BY Philip A. Fruedell
Attorney

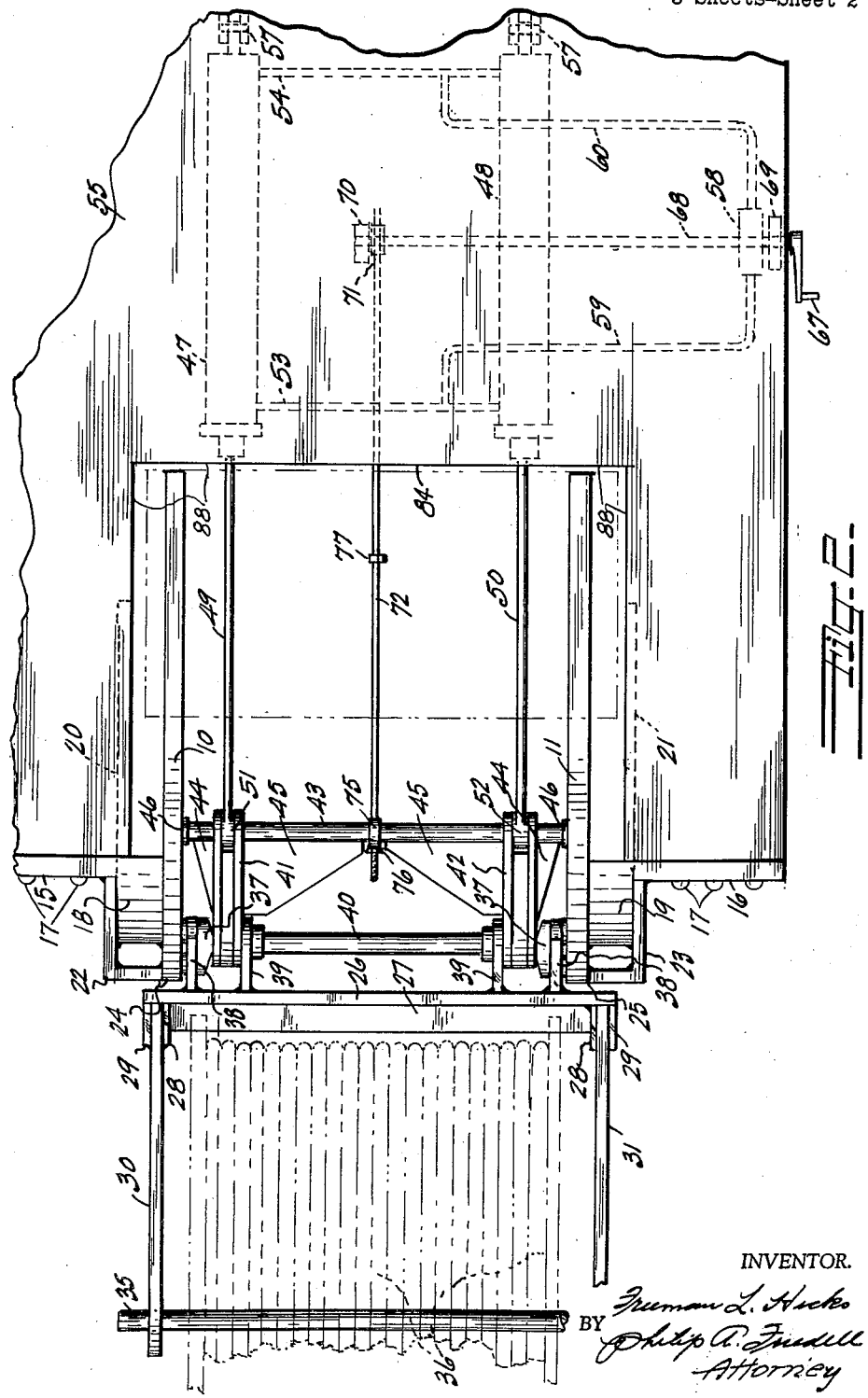

Dec. 11, 1962   F. L. HICKS   3,067,966
CABLE REEL HANDLING APPARATUS
Filed Dec. 5, 1960   3 Sheets-Sheet 3
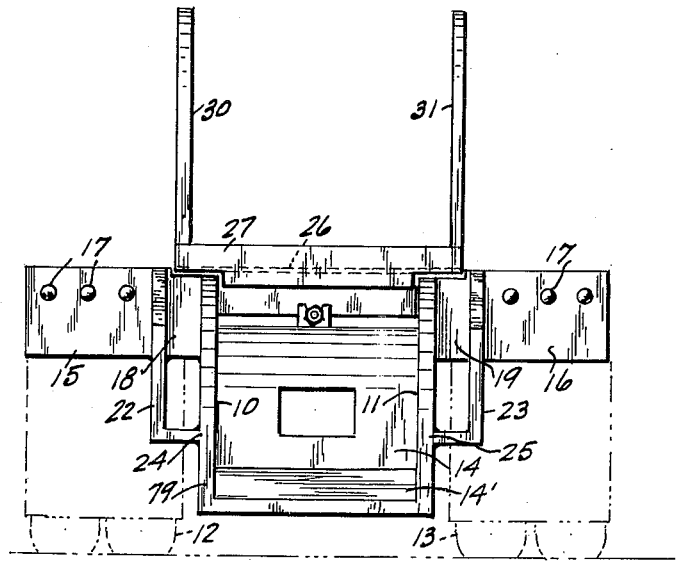
INVENTOR.
Freeman L. Hicks
BY Philip A. Freedell
Attorney

United States Patent Office 3,067,966
Patented Dec. 11, 1962

3,067,966
CABLE REEL HANDLING APPARATUS
Freeman L. Hicks, 299 Park St., San Leandro, Calif.
Filed Dec. 5, 1960, Ser. No. 73,706
10 Claims. (Cl. 242—86.5)

This invention relates to improvements in means for handling cable reels, for transportation and storage, including the loading and unloading, support for out- or in-reeling of the cable, transfer to and from warehouses or storage areas, and provides an attachment which can be applied to freight or warehouse platforms, trucks, trailers, and semi-trailers, and which will handle the various sizes of reels which at present range up to seven feet in diameter and a maximum weight of around fourteen tons, and provides an attachment which not only is useful, but urgently needed in view of the present difficulty encountered as well as the high labor cost connected with the storage and transport of these reels of cable.

It is well known that single reels of cable are transported on trailers, usually of the two-wheel type, and that these devices permit the reeling and unreeling of cable. However, they cannot be used for loading the reels on a truck or platform, or unloading therefrom, and they are not attachments, while applicant's device is attached to, and forms an integral part of a truck, trailer, or platform, and is capable of loading or unloading a series of reels of the same or different diameters, to the full capacity of the device being loaded on. The reels can be quickly loaded, unloaded, or positioned for cable payout or in-reeling without recourse to any adjustments.

The attachment is applied to the rear portion of a truck or trailer which it overhangs, or to the side or end of a platform or other support.

The objects and advantages of the invention are as follows:

First to provide an attachment for trucks and trailers and the like through the medium of which cable reels of varying sizes can be successfully quickly loaded and unloaded.

Second, to provide an attachment as outlined in which any reel can be positioned for out-reeling or in-reeling at will.

Third, to provide an attachment as outlined which can be applied to the rear portion of a truck or the like, or to platforms or other supports, for efficient and rapid handling of cable reels.

In describing the invention reference will be had to the accompanying drawings, in which:

FIG. 1 is a side sectional elevation through the invention showing the carrier in the vertical or elevated position with a cable reel ready to be rolled forward on the trailer deck.

FIG. 2 is a top plan view of the invention with the cable carrier in lowered position.

FIG. 3 is a rear elevation of the invention as installed on a semi-trailer, and with the cable reel carrier in the elevated or vertical position.

FIG. 4 diametrically illustrates the combined manual and automatic control for operation and limitation of travel of the cable reel carrier.

The invention may be built as a unitary structure with any type of suitable support, and is shown as an attachment fixedly mounted on and in the rear portion of a truck, and consists of a frame and a cable reel carrier, and an operative connection between the cable reel carrier and the frame for movement of the cable reel carrier between a rearwardly projecting horizontal position and an upwardly projecting vertical position on top of a support, and power means cooperative between the support and the carrier for moving the carrier between the respective positions, and axial support means for the cable reel in the carrier, and control means for the power means.

The frame consists of a pair of arcuate tracks 10 and 11 which are limited as to spacing by the inner ones of the tires, indicated at 12 and 13 which must be cleared, and are fixedly spaced by the arcuate wall 14 which is inset relative to the tracks and terminates in a sloping base portion 14'. Arms 15 and 16 project from the respective sides of the track portion and these arms are fixedly secured to the rear end of the truck as indicated at 17. The portions 18 and 19 have arms 20 and 21 which project forwardly as indicated and are fixed to the intermediate beams or stringers of the truck bed.

Drop members 22 and 23 have their upper ends fixed to the arms 15 and 16 with the portions 18 and 19 having the respective sides fixed respectively to the exteriors of the track members and the interiors of the drop members, as by welding, the drop members being formed at right angles at their lower ends with the terminals fixed to the track members and extending to the very edge for maximum support as indicated at 24 and 25.

The cable reel carrier consists of a base or floor member 26 which is reinforced at its lower or rearward end as indicated at 27 and is provided with a pair of flanges 28 and 29 at each side between which the carrier arms 30 and 31 are fixedly secured, and these arms have aligned passages 32, 33 and 34 to accommodate various diameters of cable reels, the passage 32 being elongated so that the shaft 35 can be inserted when the reel hub is not exactly aligned, this largest reel weighing in the neighborhood of 14 tons, this leeway for insertion of the shaft proves very helpful.

The passage 34 is made to accommodate two different smaller diameters of reels, the various shaft passages eliminating the need for maneuvering the carrier to suit the reel diameter. The carrier arms are spaced to receive the widest reel, and for that reason, it will be noted that the floor member 26 projects beyond the sides of the tracks, but which would not be necessary if the spacing of the tracks was not limited by the wheels.

The supporting means for the cable reel carrier consists of a pair of lower or rear rollers 35 which are mounted on brackets 36 which are fixed to the bottom of the floor member and which rollers operate in the tracks 10 and 11 which are channel shaped with both, outer and inner walls; and at the forward or upper end the supports consist each of a rocker 37 which is intermediately pivotally mounted on a bracket 38 which projects about twice the distance of the bracket 36, in the present case, about 3 inches more, the rocker having a roller at each end operating in the track, there actually being two of these brackets for each side as indicated at 39, with the rockers mounted on a shaft 40.

Coupling links 41 and 42 have one end each rotatable on the coupling shaft 40 and interposed between the inner bracket and the rocker, with the other ends rotatable on a shaft 43, or preferably fixed thereon and provided with gussets 44 and 45 to provide extreme rigidity with minimum weight of parts, a roller 46 being rotatably mounted on each end of this shaft.

The operating and power mechanism and control means therefor may be of any suitable type, the most satisfactory and simplified being illustrated as consisting of two fluid motors 47 and 48 each having a plunger rod respectively 49 and 50 which are respectively connected to the links 41 and 42 through the shaft 43 as indicated at 51 and 52.

The cylinders 47 and 48 are connected in parallel as indicated at 53 and 54, the forward ends of the cylinders being pivotally supported by the support 55 through the medium of a cross member 56, the pivotal connection being indicated at 57.

The power means and control means therefor are not limited to a single valve control when fluid motors are used, and are shown as consisting of a four-way valve 58 having connections 59 and 60 to the parallel connections 53 and 54, the other connections being from the valve to the fluid supply 61 through a conduit 62, and from the pump 63 to the valve through the connection 64 with interposed bypass 65 to the supply 61 through a pressure relief valve 66.

Referring to FIGS. 2 and 4, the manual control consists of a lever 67 which is mounted on a shaft 68 which shaft is mounted in bearings 69 and 70, this shaft having a second lever 71 fixed thereon and which second lever has a control rod 72 pivotally connected thereto as indicated at 73, the rod being slidable in an eye 74 which has an integral collar 75 in which the shaft 43 is non-rotatable, the eye being sufficiently large to prevent any possibility of binding on the rod. The rod has two stop members 76 and 77 which may be made adjustable therealong, but shown with adjustment only for the stop member 76.

Thus, as the carrier is moved to its rearward lower position indicated by the dotted figure in FIG. 1, the stop 76 is engaged by the eye 74, drawing the lever 71 with it, and thus moving the valve 58 to the position shown in FIG. 4, thus terminating communication and locking both ends of the cylinder with the carrier locked in its lowered position.

For reversing operation to raise the carrier back onto the truck, the lever 67 is manually moved to the position 67′, which places the forward end of the cylinder in communication with the pump 63 through line 59, and the rearward end in communication with the sump 61 through lines 60 and 62, thus drawing the cradle back to the position on top of the truck, and as it approaches its terminal of travel, the eye 74 engages the stop 77, moving the levers back to the original positions shown and again closing the circuits through lines 59 and 60 as shown in FIG. 4. Manual movement of the lever 67 to the position 67″ will start operation in the opposite direction until the eye 74 again engages the stop 76. Thus the control consists of manual starting and automatic stopping.

The lower portion 79 of the track is tangential to the upper portion 80 for a distance of approximately one foot, with the upper portion 80 circling over the top 81 through an arc in excess of 90 degrees and curving into a horizontal portion extending forwardly parallel to the deck, the drop below the deck being equal to the drop of the brackets 38 and 39, so that the floor 26 of the carrier will be coplanar with the deck when the carrier is advanced to its foremost position.

It will be noted that the deck is removed to clear the carrier, the carrier moving just up to the edge 84 so that the reel 36 can be rolled onto the truck bed after the shaft 35 is removed after which the carrier can be returned to its lowered position and additional reels raised to the unloading position sequentially and rolled onto the truck bed after removal of the supporting shaft, to the capacity of the truck, retaining the last cable reel in the carrier. The cable reels are as readily unloaded from the truck by sequentially rolling the reel onto the floor of the carrier, inserting the shaft and reversing the operation of the carrier. Also, the shaft passage 32 is downwardly recessed as indicated at 82, so that when the carrier is elevated slightly from the lowered position indicated at 83, the shaft will rest in that recess and permit the cable to be removed from or wound onto the reel.

It will be noted that when the carrier is in its most advanced position, the rear rollers are located at the topmost portion of the track, while the other rollers are in a lowered position with the front of the floor against the edge 84 of the deck 85 to thus stabilize and retain the carrier in its advanced position.

As shown in FIGS. 2 and 4, the carrier is in its lowered position, the valve having been closed through retraction of the rod 72 by the eye 74. Since the lever 67 cannot be operated in opposition, the carrier cannot be lowered further, but can be reversed by moving the lever 67 to the right which moves the valve to the dotted position 86—87 causing the plunger rods to be retracted to draw the carrier to the elevated and forward position until the eye 74 engages the stop 77 and moving the shaft to turn the valve back to the stop position shown, at which time the fluid from the pump will be bypassed through the pressure relief valve 66. Again the carrier can only be reversed.

I claim:
1. In a cable reel handling device including a support having a top having an end, said top having a gap formed inwardly from said end; elevating and lowering means for a cable reel comprising
   a frame fixedly mounted in said gap and having spaced opposed vehicular tracks,
   a cable reel carrier having a floor and being vehicularly operable in said tracks and projecting outwardly from said end when in lowered position, and having a support shaft for supporting a cable reel therein during raising and lowering movements of the carrier
   power means and control means therefor and cooperative between said carrier and said frame for operating said carrier between a lowered, outwardly projected position and a position in which the cable reel is elevated over the support with support transferred from the support shaft to said floor with the cable reel supported on its periphery in a plane coincident with said top whereby removal of the shaft frees the cable reel for rolling transfer onto the support.

2. In a cable reel handling device including a support having an end, and a top having a gap formed inwardly from the end; elevating and lowering means for a cable reel comprising
   a frame fixedly mounted in said gap and having spaced opposed vehicular tracks,
   a cable reel carrier including cable reel support means and vehicularly operable in said tracks and projecting outwardly from said end, and having
   power means and control means therefor and cooperative between said carrier and said frame for operating said carrier to a position in which said cable reel is supported on its periphery in a plane coincident with said top, and including support means for said periphery; said cable reel carrier having a floor constituting said support means and having
   spaced arms having registrable slots formed therein, and
   a removable shaft insertable through said slots and the hub of said cable reel,
   with the shaft resting in one end of the slots during the initial portion of elevating movement of the carrier and gravitationally moving to the other ends of the slots during the terminal elevating movement for lowering the reel to rest on said floor, with the terminal elevating movement aligning said floor with said top to provide for rolling the cable reel from the floor to the top for loading a plurality of cable reels on said top.

3. In a cable reel handling device including a support having an end, and a top having a gap formed inwardly from the end; elevating and lowering means for a cable reel comprising
   a frame fixedly mounted in said gap and having spaced opposed vehicular tracks,
   a cable reel carrier including cable reel support means and vehicularly operable in said tracks and projecting outwardly from said end, and having
   power means and control means therefor and cooperative between said carrier and said frame for operating said carrier to a position in which said cable reel is supported on its periphery in a plane coincident with said top, and including support means for said periphery, in which said tracks include an initial perpendicular portion continuing upwardly in a forwardly curving circular portion continuing beyond the vertical axis thereof, and thence reverse curving into a horizontal extension parallel with and in a plane below said top for lowering the carrier to a position with the periphery of the cable reel coplanar with said top and including supporting means for said periphery to permit removal of the cable reel from said carrier to said top.

4. In a cable reel handling device including a support having an end, and a top having a gap formed inwardly from the end; elevating and lowering means for a cable reel comprising a frame fixedly mounted in said gap and having spaced opposed vehicular tracks, a cable reel carrier including cable reel support means and vehicularly operable in said tracks and projecting outwardly from said end, and having power means and control means therefor and cooperative between said carrier and said frame for operating said carrier to a position in which said cable reel is supported on its periphery in a plane coincident with said top, and including support means for said periphery, said control means including a reversing valve movable to three positions, including terminal reversing positions and intermediate stop-and-lock positions, operating means associated with said valve and cooperative with said carrier for moving the valve to the intermediate position in each direction of travel for terminating movement of the carrier in each direction, said valve being manually movable to the reversing positions and stop position at will for manual control of the carrier.

5. In cable reel transfer apparatus including a support having an elevated top having an end, and a gap formed inwardly from said end, transfer means comprising a frame mounted in said gap and having opposed circular tracks initiating in a vertical portion continuing upwardly through a circular portion and terminating in a horizontal portion, a cable reel carrier having a floor having spaced arms projecting therefrom to receive a cable reel therebetween, said arms having aligned passages to receive a reel support shaft, rollers mounted on said floor and vehicularly operating in said tracks, a coupling shaft, a link having one end pivotally connected to said floor and rotatable on said coupling shaft at the other end with rollers mounted thereon and operating in said tracks, and fluid motors having cylinders anchored to said support and plungers operatively connected to said coupling shaft for moving said carrier from the lowered position to an advanced elevated position with said floor coplanar with said top for transfer of a cable reel from said carrier to said top, whereby a plurality of cable reels may be loaded on said top.

6. A structure as defined in claim 5, said aligned passages being elongated with the respective ends differently spaced from said floor for support of a cable reel with its periphery in clearing relation to said floor when said carrier is in a lowered position to permit out- and in-reeling of cable when partly elevated, with the cable reel support shaft gravitationally moving to the other ends of the passages for support of the periphery of the cable reel on the floor and thereby freeing the support shaft for removal to provide for rolling the cable reel onto the top when the carrier is in the advanced elevated position.

7. A structure as defined in claim 5, control means for said fluid motors comprising a valve manually adjustable to two positions for reversing the operation of the cable reel carrier, and an intermediate position automatically controlled by said carrier in respective directions of travel and including a connection cooperative between the valve and the carrier for stopping said cable reel carrier at respective predetermined terminals of travel.

8. Cable reel transfer means for a truck or the like having a bed, comprising a cable reel carrier having a floor with spaced projecting arms to receive a cable reel therebetween, a frame mounted in a gap formed in said bed, guiding means cooperative between said frame and said carrier for guiding said cable reel carrier between respective positions, in one of which the arms project rearwardly from said end, and in the other of which the arms project vertically with said floor coplanar with said bed, mounting means for the cable reel comprising elongated slots formed through said arms with one end of the slots located a distance in excess of the radius of the cable reel, and the other end located a distance less than said radius, a reel support shaft insertable through said slots and axially through the cable reel and being located in said one end with the periphery of the cable reel clearing said floor when the carrier is in a lowered position, and gravitationally moving to the other end with the periphery of the cable reel resting on the floor and the shaft free for removal for rolling the cable reel onto the truck bed when the carrier is in the advanced elevated position, power means cooperative between the truck or the like and the carrier for moving the carrier to the respective positions, and control means for said power means.

9. A structure as defined in claim 8, said power means and control means therefor comprising fluid motors operatively connected between the truck and the carrier, and a supply of fluid under pressure therefor, said control means including a valve having means cooperative with said carrier for closing the valve at the respective terminals of travel of the carrier, and including means manually operable for reversing operation of the carrier and for manual control of operation at will.

10. Cable reel transfer means comprising an elevated plane support having a gap formed inwardly, and supporting means for said support, a cable reel carrier having a floor with spaced arms projecting therefrom, a frame supported in said gap, guiding means cooperative between said carrier and said frame for guiding said carrier from a lowered position with said arms projecting horizontally to receive a cable reel therebetween, to an elevated position with the floor coplanar with said support and the arms projecting upwardly, power means cooperative between said support and said carrier for moving said carrier to the respective mentioned positions, control means for said power means and having means cooperative with said carrier for terminating travel of said carrier in the respective terminal positions, with said control means manually operative for reversing operation of said power means at the respective terminals of travel, said arms having shaft receiving means for supporting a cable reel with its periphery clearing said floor in the lower portion of travel, and resting on said floor in the elevated position with the shaft freed for removal for rolling of the cable reel onto the support, whereby a plurality of cable reels are transferable between the support and said supporting surface.

References Cited in the file of this patent

UNITED STATES PATENTS

| | | |
|---|---|---|
| 2,647,651 | Vincent | Aug. 4, 1953 |
| 2,867,390 | Anrig | Jan. 6, 1959 |
| 2,913,194 | Garnett | Nov. 17, 1959 |